(12) United States Patent
Hussaini et al.

(10) Patent No.: US 7,195,561 B2
(45) Date of Patent: Mar. 27, 2007

(54) VIDEO GAME CONTROLLER WITH ILLUMINATED CABLE

(75) Inventors: Saied Hussaini, Miami, FL (US); Marc Iacovelli, Miami, FL (US); Matthew Johnston, Boyds, MD (US)

(73) Assignee: Intec, Inc., Miami, FL (US)

( * ) Notice: Subject to any disclaimer, the term of this patent is extended or adjusted under 35 U.S.C. 154(b) by 609 days.

(21) Appl. No.: 10/252,823

(22) Filed: Sep. 24, 2002

(65) Prior Publication Data

US 2004/0058733 A1 Mar. 25, 2004

(51) Int. Cl.
A63F 9/24 (2006.01)
A63F 13/00 (2006.01)
A63F 13/02 (2006.01)

(52) U.S. Cl. .............................. 463/31; 463/37; 463/47; 273/148 B

(58) Field of Classification Search .................. 436/37, 436/38, 39, 36; 273/148 B; 345/161
See application file for complete search history.

(56) References Cited

U.S. PATENT DOCUMENTS

| 2,410,277 | A | 10/1946 | Farris |
| 5,286,922 | A | 2/1994 | Curtiss |
| 6,159,037 | A | 12/2000 | Madsen et al. |
| 6,347,172 | B1* | 2/2002 | Keller et al. ................ 385/102 |
| 6,854,869 | B1* | 2/2005 | Fernandez .................. 362/488 |
| 2002/0065134 | A1* | 5/2002 | Ogata et al. .................. 463/37 |
| 2004/0048665 | A1* | 3/2004 | Ogata et al. .................. 463/37 |

\* cited by examiner

*Primary Examiner*—Corbett B. Coburn
*Assistant Examiner*—Sunit Pandya
(74) *Attorney, Agent, or Firm*—Berenato, White & Stavish

(57) ABSTRACT

A light source is provided to illuminate a cable connecting a video game controller to a game console. A low power consuming LED in light communication with a side glowing fiber optic cable may be employed and integrated into the communication bundle extending between the controller and console. Alternately LED lights may be disposed at discrete points along the cable. A shield may also be disposed between the light cable and communication bundle to inhibit interference. The entire bundle is preferably wrapped in a clear or translucent material to allow light to emanate from the cable.

16 Claims, 4 Drawing Sheets

VIDEO GAME CONTROLLER WITH ILLUMINATED CABLE

BACKGROUND OF THE INVENTION

1. Field of the Invention

The present invention relates to video game controllers and more specifically to a controller with an illuminated cable.

2. Description of the Related Art

Computer video games are well known in the art. Such devices range from small hand held all-in-one units, to larger stand-alone units which interact with stand alone controllers and stand alone video display devices. Small hand held devices are very portable. However, the graphics and sophistication game play are substantially inferior to stand alone units due limited processing power and associated peripherals. For more sophisticated play, stand alone computer units provide tremendous processing power and work with associated peripheral devices, such as a remote controller and television display in an attempt to bring the player a more dramatic gaming experience to that of hand held devices. One such stand-alone device is disclosed in U.S. Pat. No. 6,422,943 which is hereby incorporated by reference. These devices are widely available on the market and are well known in the art. FIG. 1 depicts such a conventional stand-alone computer video gaming device. A central stand-alone console contains all the essential processing components to run a computer game. A controller is connected to the console, via a cable, to communicate operation control commands from a user. A display is connected to the gamming deice to display interactive video gaming images.

The use of a cable between the controller and console poses an obstacle and potential safety hazard. The cable must extend from the console to the controller during game play. Furthermore, even when game play has been suspended, these cables often remain exposed which may trip a person passing by. Furthermore, as video games are often played in dark environments to heighten intimacy with the game, the communications cables are very difficult to see. This results not only in a safety hazards to persons who happen by, but a person who may trip or otherwise get caught up in the cable may cause the console unit to lodge from its support and knock over peripheral and other equipment usually found around such game consoles. This problem is further compounded when more than one controllers are connected to the game console.

SUMMARY OF THE INVENTION

The present invention is directed to a computer game controller with an illuminated cable. In one embodiment, a light source is provided in the controller such as a low power consuming LED in light communication with a side glowing fiber optic cable. The side glowing fiber optic cable is integrated into the communication bundle extending between the controller and console. The fiber optic cable may simply run along an outside of the conventional communication bundles within a clear cover thus visibly exposing the fiber optic cable. In an alternate embodiment a pair of low voltage wires may run along the cable with LED lights spaced at discrete points along the cable. A shield may be disposed between the light cable and communication bundle to inhibit interference. The entire bundle is then wrapped in a clear or translucent material to allow light to emanate from the cable.

BRIEF DESCRIPTION OF THE DRAWINGS

FIG. 3b is a cross sectional view taken along lines 3b—3b of FIG. 3a.

DETAILED DESCRIPTION OF THE PREFERRED EMBODIMENTS

Figure 1:
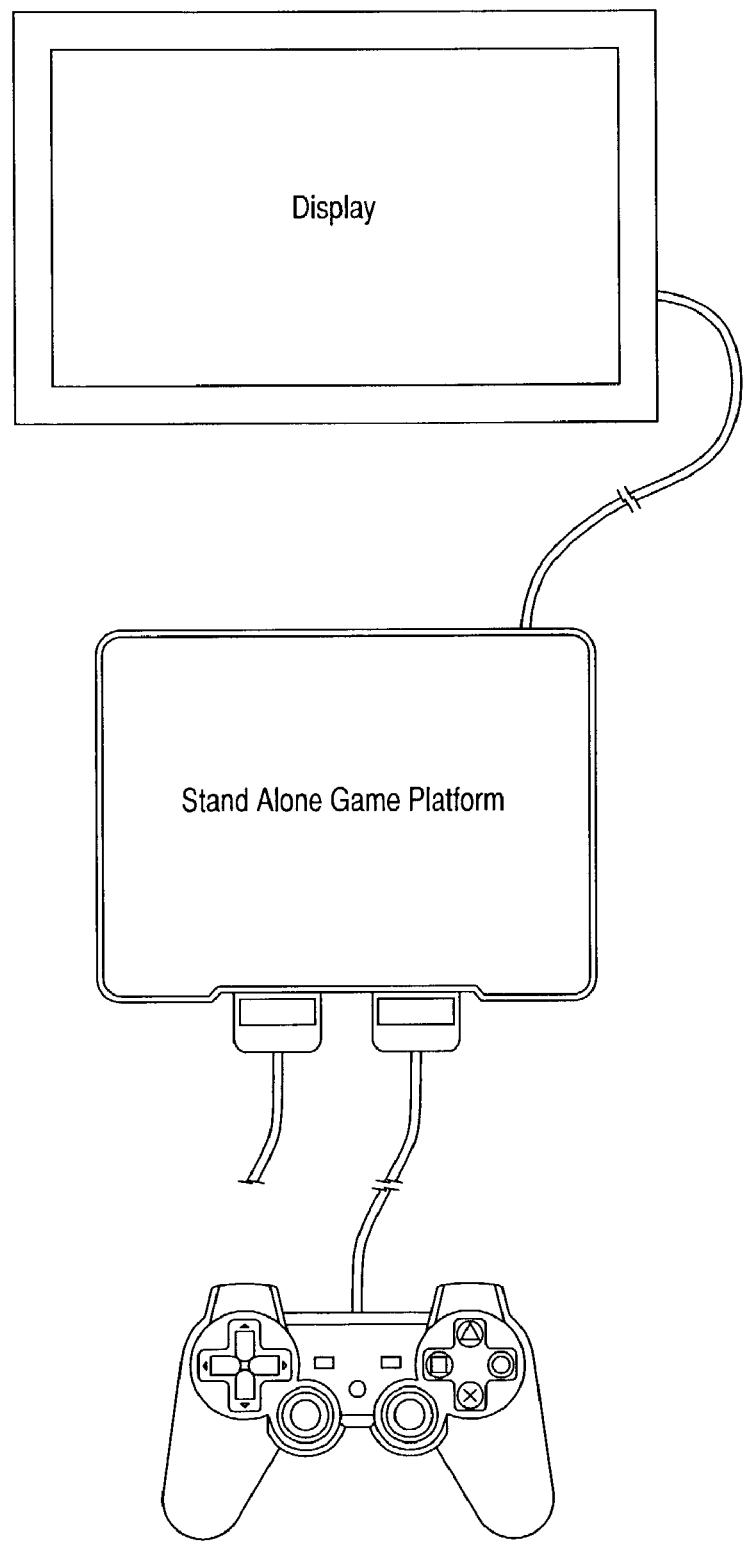
FIG. 1 is a plan view of a stand-alone video game arrangement according to the prior art.
Figure 2:
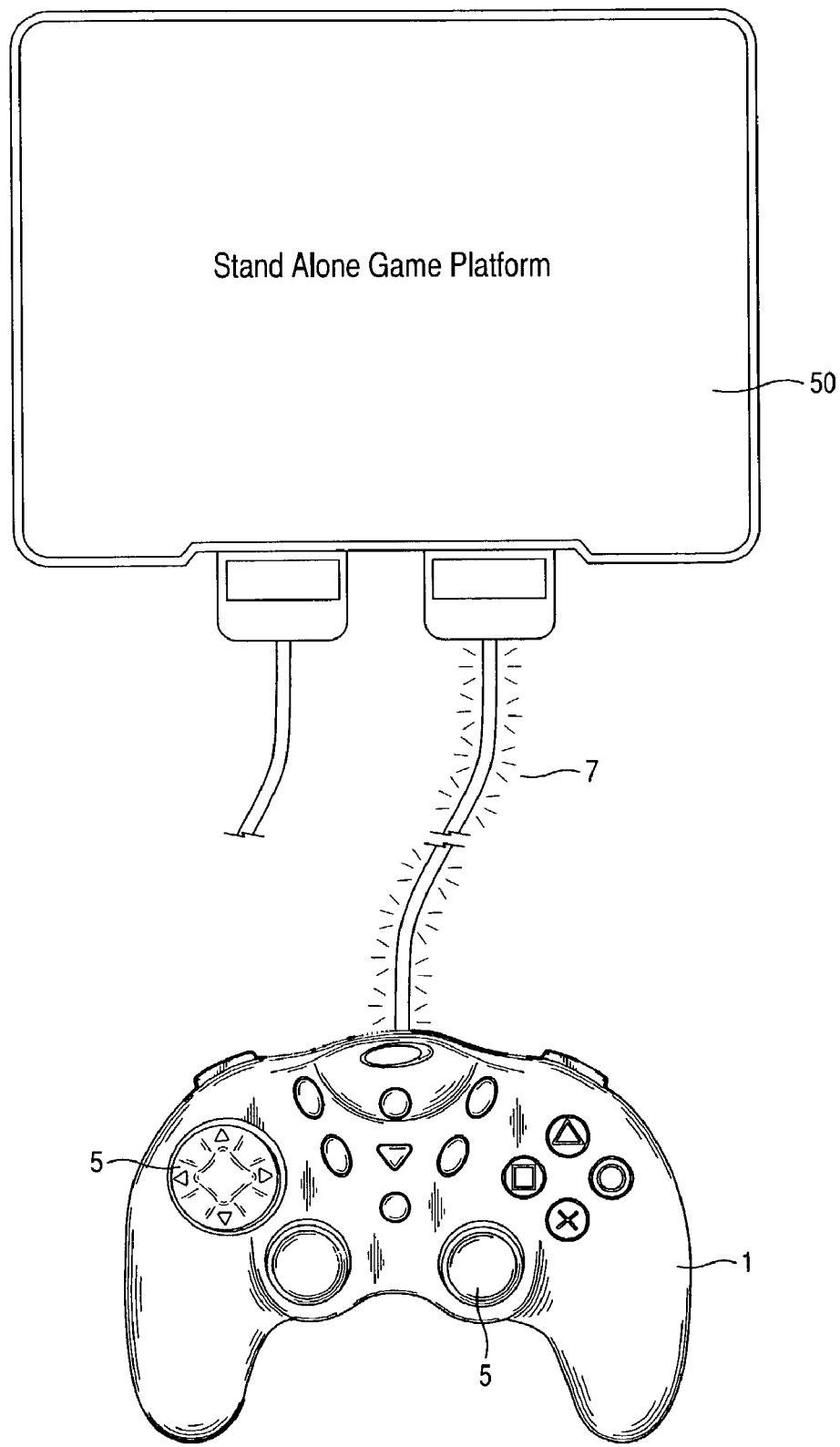
FIG. 2 is a plan view of a controller with integrated video display device according to the present invention.

FIG. 2 depicts a controller 1 of the present invention connected to a computer gaming system 50. The controller 1 includes a hand held body with operation members 5 or control buttons logistically placed for manipulation by a user to transmit operation commands to the computer when playing a particular video game. Such arrangements are well known in the art. The communication cable 7 includes an illumination device to illuminate the cable to increase the visibility of the cable as well as providing illuminated ornamentation. Several embodiments may be employed to illuminate the cable as will now be described.

Figure 3A:
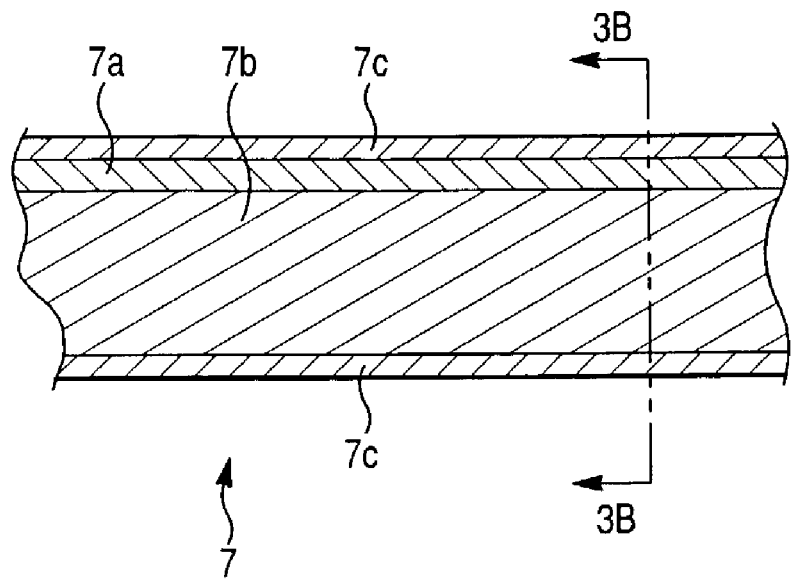
FIG. 3a is a partial sectional view along a length of the cable of FIG. 2.
Figure 3B:
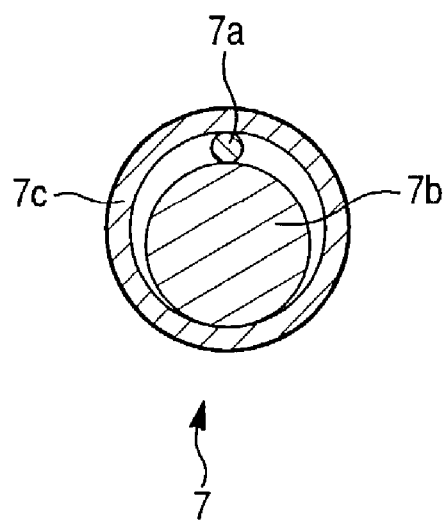

FIG. 3a depicts a partial segment of the communication cable 7 having a single side glow fiber optic cable 7a running along side of a conventional cable bundle 7b for transmitting operation commands to the game console 50. A light source (later described) is simply connected to the fiber optic cable 7a to introduce light through the cable for transmission throughout the length thereof. The fiber optic cable 7a preferably runs along the entire length of the conventional bundle 7b to the console. A protective sheathing 7c is preferably disposed about the conventional bundle 7b and fiber optic cable 7a. The protective outer sheath 7c is made of light transmitting material such as a clear or translucent plastic or polyvinyl material. FIG. 3b shows a cross section of the cable 7. The inner cable 7b is simply the communication cable 7b often associated with a conventional video game controller. The cable 7b carries operational command signals to and from the controller to facilitate interactive play of the video game. The side glow fiber optic cable 7a is disposed adjacent the communication cable 7b and run substantially along the entire length thereof. The protective sheath 7c simply covers both the communication cable 7b and fiber optic cable 7a to form a single illuminated bundle 7 between the controller and computer game console 50. The sheathing 7c may be made of a clear plastic, polyvinyl, or other flexible material to permit direct visibility of the fiber optic cable 7a or may be translucent to give off a softer glow. The sheathing 7c may also be tinted various colors for greater ornamental effect.

It is to be understood that side glow fiber optic cables are known in the art. They are often used to create ornamental signs or other illuminated art. Such off the shelf side glow fiber optic cables may be employed where they are simply connected to an adequate light source. Off course, conventional data communications fiber optic cables may also be employed. While data communication cable are designed to minimize radial leakage, they may be simply altered by changing the angle of incidence of the light introduced to the cable as well as removal of the exterminator cladding to promote sufficient radial leakage to allow the cable to illuminate radially. In one embodiment, the exterior cladding may be selectively removed from a conventional data cable to give off a desired pattern of light. The cable may also be notched at discrete intervals, etc. Endless combinations exist to create different ornamental illumination. However, the fundamental function of the illuminated controller cable 7 of the present invention is to promote visibility. Because the illuminated cable is primarily intended to enhance visibility rather than to illuminate another device, there is no need to give off a tremendous amount of light. All that is necessary is that sufficient light emanates to enhance visibility of the cable whether in normal lighting conditions or in dark conditions. The light source thus need not be very powerful and can be supplied by a single LED light drawing very little voltage and very little current.

State of the art stand alone computer gaming platforms also transmit low DC voltage across the communication bundle 7b to power circuitry within the controller, power LED lights in operations members, power vibration devices, etc. Such systems are known to supply a three volt source over the communication cable. (However, other voltage levels may certainly be utilized.) Such a voltage source may be utilized to illuminate low voltage LEDs in order to illuminate the side glow cable which will now be described with reference to FIG. 4.

Figure 4:
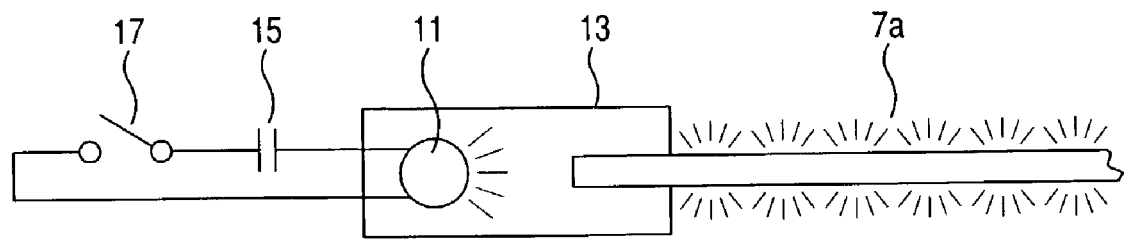
FIG. 4 is a schematic representation of a hybrid LED fiber optic cable assembly of the present invention.

FIG. 4 depicts a schematic representation of a light source and primitive circuitry. Preferably a low DC voltage LED 11 is disposed within a very small light tight chamber 13. One end of the fiber optic cable 7a is simply disposed within the chamber 13. When the LED 11 is illuminated, light is simply transmitted through the cable 7a giving off light along its entire length. (It is to be understood that off the shelve hybrid LED fiber optic cables exist within the market and may be employed to simplify manufacture. Such a hybrid LED fiber optic cables need only be arranged within the hand held unit with the fiber optic cable exiting to run along the communication cable.) The LED 11 is simply powered by a low voltage source 15 for example as supplied by the gaming system. However, the present invention alternately contemplates providing an additional independent power source to drive the illuminating light when higher intensity lighting is desired or to supplement or replace the voltage source supplied by the gaming console 50. In such an instance, one or more standard double AA batteries may be simply disposed within the hand held unit and connected to the LED 11. Of course other batteries of different size and voltage may be employed. The LED 11 need only be selected to match the voltage source whether it is supplied from the gaming console or independent source such as a battery. A switch 17 may also be employed to selectively activate the illuminated cable which is particularly desirable when employing an independent battery source. It is to be understood that the particular wiring of the LED light source and configuration within the hand held unit is well within the knowledge of one or ordinary skill in the art and therefore will not be elaborated. Only very basic wiring is needed to simply supply the proper voltage to the LED 11.

Figure 3C:
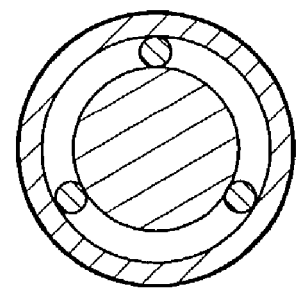
FIG. 3c is a schematic cross sectional view of an alternate embodiment of the invention shown in FIG. 3b.

Alternately, a plurality of fiber optic side glow cables 7a may run along the length of the communication cable 7b as shown in FIG. 3c. The fiber optic cables 7a can either run in a parallel longitudinal direction or may cross over each other in a helical braided fashion to give a particular ornamental illumination. Each fiber optic cable 7a can either be illuminated by a common light source such as a single LED, or by a separate LED light for each cable. The color of the LED light source, fiber optic cable and translucent sheath may be altered for various color effects.

Figure 5:
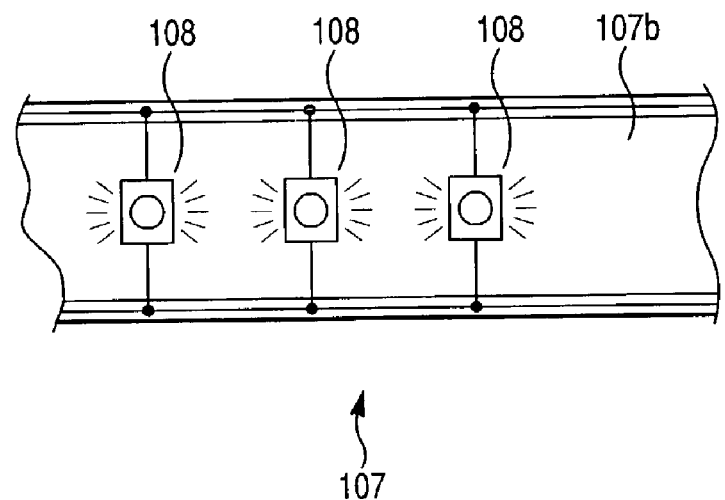
FIG. 5 is a schematic section view of a portion of the cable bundle according to an alternate embodiment of the present invention.

FIG. 5 is a schematic view of a portion of the cable bundle 107 according to another alternate embodiment of the present invention. A Rope lighting string 107a runs between the controller and the computer game console along with the communication cable 107b disposed there within. Rope lighting strings include an outer light transmitting sheathing with LED lights 108 disposed at discrete locations along its length. A wire is run along (or within) the sheathing interconnecting the LEDs 108 to a power supply or source within the hand held unit 1. Conventionally, such rope lighting strings incorporate circuitry to covert a standard AC power supply to a low voltage power supply to power the LEDs 108. However, as the rope string will draw low DC voltage directly from gaming console, there is no need for alternate circuitry. The voltage drop of the LEDS 108 within the rope string simply needs to be matched to the available voltage supplied from the game console. However, it is understood that voltage regulating circuitry, or independent voltage source such as a battery, can be simply added within the confines of the hand held unit to control the voltage supply to the LEDs 108. Such is well within the knowledge of one or ordinary skill in the art. For example, the lead wires running the length of the cable may simply be connected to a switch and voltage source similar to the embodiment of FIG. 4. So long as the proper voltage is supplied to the LED string, the cable will be illuminated.

While the foregoing invention has been shown and described with reference to a preferred embodiment, it will be understood by those possessing skill in the art that various changes and modifications may be made without departing from the spirit and scope of the invention. For example, a blinking circuit may be incorporated to cause the illuminating source to blink in various successive patterns. In such an instance the frequency response module that activates the vibration motor may be used to in turn control the voltage source of the lighted cable and blink or flicker when the vibration motor is activated. A control circuit to blink or activate the light(s) may simply be incorporated into the circuitry shown in FIG. 4 and may be simply activated in response to the activation of the frequency response module. (It is noted that vibration control and the use of such a frequency response module is disclosed in U.S. Pat. Nos. 5,857,986 and 6,135,450 and is hereby incorporated herein by reference.) Furthermore, the communication cable can be modified at the junction with the computer game console to incorporate a connection with an independent power source to power the lighting source. When implementing a fiber optic cable, the present invention contemplates and adapter or pass through device having the light source (LED or incandescent device disposed within the adapter). Such an arrangement allows for independent connection to an AC power supply to facilitate a more power lighting and brighter illumination of the cable. The adapter may also simply contain resistant circuitry to provide current directly to the LED lights 108 of the light string of FIG. 5. A shield may also be disposed between the communication cable 7b and the illuminating cable 7a. Lastly, while the preferred embodiment employs a LED light source to reduce heat and power consumption, it is to be understood that incandescent or other light generation illuminating sources may be employed.

What is claimed is:

1. An integrated video game controller comprising:
a hand held body having a plurality of operation members logistically positioned for manipulation by a user,
an integrated light source; and
at least one communication cable operatively connected to said hand held device and provided to transmit operation commands to a computer gaming system in response to manipulation of said operation members by said user, said communication cable having an illumination device directly connected to said integrated light source and emanating from at least one point along said communication cable thereby enhancing visibility of said communication cable, wherein said hand held held body, integrated light source and at least one communication cable are all integrated within a single self contained assembly; a battery disposed within said hand held body and being connected to and independently energizing said light source.

2. The video game controller according to claim 1, wherein said at least one communication cable includes:
a bundle to transmit said operation data from said controller to said computer gaming system;
a fiber optic side glow cable running substantially along a length of said bundle and being in permanent communication with said light source; and
a light transmitting sheath covering said bundle and said fiber optic side glow cable.

3. The video game controller according to claim 2, further comprising an LED light source disposed within said hand held body and in light communication with said side glow fiber optic cable to supply light through said side glow fiber optic cable.

4. The video game controller according to claim 3, wherein said LED light source is electrically connected to a voltage source disposed within said hand held unit.

5. The video game controller according to claim 4, further comprising a switch electrically connected to said LED light source to selectively connect said LED light to said voltage source.

6. The video game controller according to claim 2, wherein said side glow fiber optic cable extends substantially along an entire length of said communication cable emitting light continuously along a length there along.

7. The video game controller according to claim 2, wherein said light transmitting protective sheath is translucent.

8. The vide game controller according to claim 2, wherein said translucent sheath is clear.

9. The video game controller according to claim 2, wherein said fiber optic side glow cable includes a plurality of fiber optic side glow cables.

10. The video game controller according to claim 2 further comprising, an interference shield disposed between said fiber optic side glow cable and said bundle.

11. A video game controller comprising:
a hand held body having a plurality of operation members logistically positioned for manipulation by a user,
a light source:
at least one communication cable operatively connected to said hand held device and provided to transmit operation commands to a computer gaming system in response to manipulation of said operation members by said user, said communication cable having at least an illumination portion in direct and permanent communication with said light source and emitting light there from to enhance visibility of said communication cable; wherein said hand held body, said light source, and said at least one communication cable being a single integrated assembly; a battery disposed within said hand held body and being connected to and independently energizing said light source.

12. The video game controller according to claim 11, wherein said light emitting portion extends along a substantial length of said communication cable.

13. The video game controller according to claim 11, wherein said communication cable includes a plurality of LED lights disposed at discrete points along said light emitting portion and said LED lights being electrically connected to a voltage source in said hand held unit.

14. The video game controller according to claim 13, further comprising a switch electrically connected to said plurality of LED lights to selectively connect said LED light to said voltage source.

15. The video game controller according to claim 1, wherein said communication cable includes:
a separate bundle to transmit said operation data from said controller to said computer gaming system; and
a light transmitting sheath covering said bundle and said plurality of LED lights.

16. The video game controller according to claim 13, further comprising, an interference shield disposed between said fiber optic side glow cable and said bundle.

* * * * *